United States Patent Office 3,520,448
Patented July 14, 1970

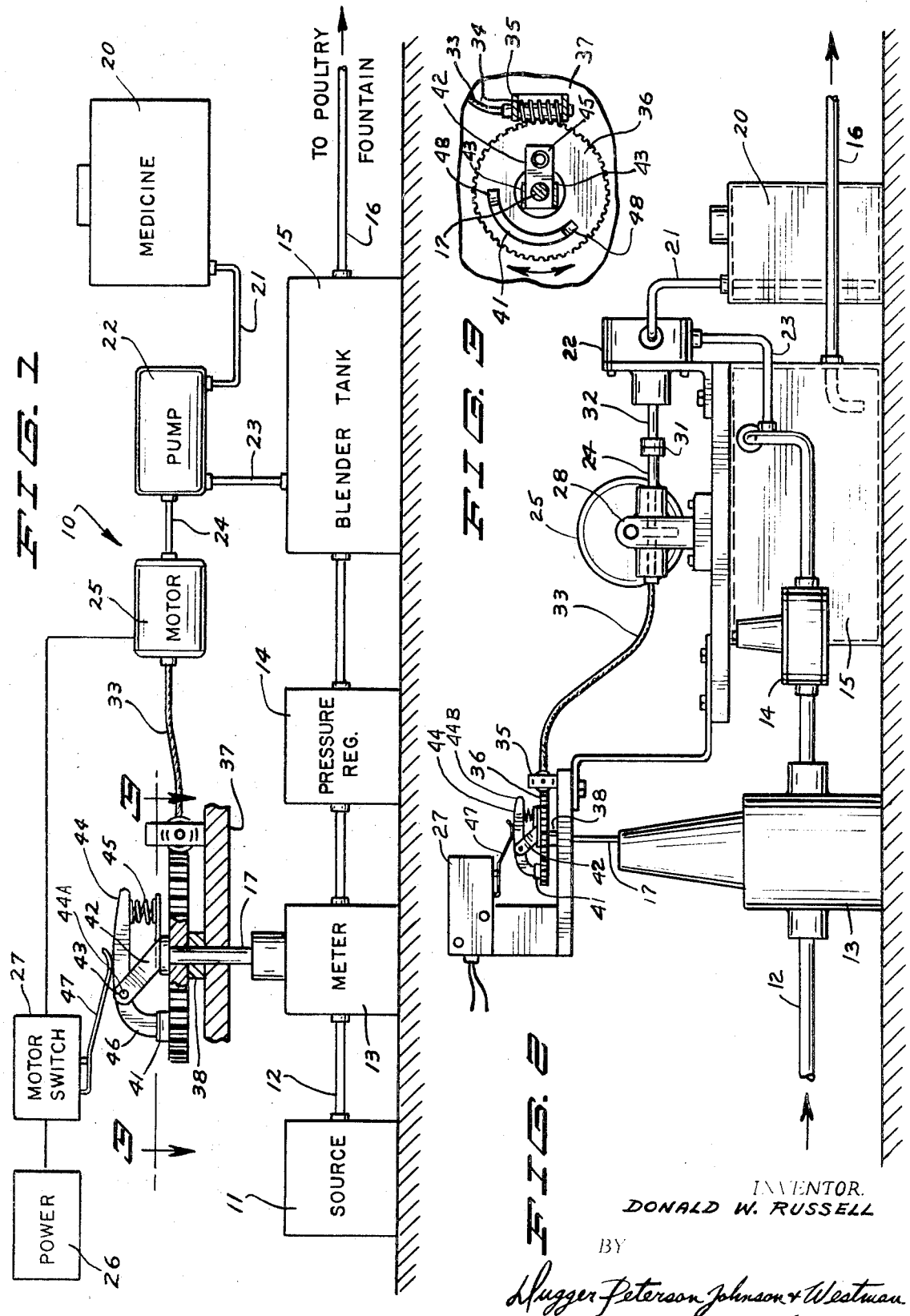

3,520,448
LIQUID PROPORTION DEVICE
Donald W. Russell, 2512 37th Ave. S.,
Minneapolis, Minn. 55406
Filed Apr. 10, 1968, Ser. No. 720,044
Int. Cl. B67d 5/08
U.S. Cl. 222—57       7 Claims

ABSTRACT OF THE DISCLOSURE

A liquid proportioning device for inserting a needed amount of medicine into a water supply, particularly for poultry, wherein the amount of the medicine introduced is precisely controlled. A water meter is used to measure the amount of water consumed in the system, and the meter in turn controls a switch for actuating a pump for injecting medicine into a blending tank wherein the medicine and water are mixed after a predetermined amount of water has been consumed. The pump is driven by a motor which also drives a switch follow up device that quickly closes off the motor after the correct amount of medicine has been dispensed.

BACKGROUND OF THE INVENTION

Field of the invention

This invention relates to a proportioning device for adding small amounts of one liquid into another very accurately.

The prior art

One of the problems in proportioning medicines into a water supply for poultry, in particular, is to make sure that the medicine is adequately blended so that there is a sufficient amount of medicine in all of the water consumed, and yet there is not an over supply which can be toxic to the poultry.

The precise control of the metering pump for dispensing the medicine is thus necessary. In order to obtain such precise control, there have been patents which used a meter drive for control of the pump, but the structures are not accurate enough for satisfactory operation.

SUMMARY OF THE PRESENT INVENTION

The summary of the present invention relates to a blender for blending medicines (or other substances) into a water supply in a predetermined proportion, and which dispenses the medicine into the water supply in response to the amount of water that is consumed in the system. A water meter is used for controlling a switch for controlling a motor which in turn drives a dispensing pump. Once the motor starts, the pump drives and injects medicine into a blending tank and at the same time actuates a follow up mechanism which will close the switch off after the motor has revolved a predetermined amount in relation to the rotation of the meter. By use of the blending tank, and by having a precise control on the medicine metering pump, it is insured that the water consumed by the poultry is properly medicated, but is not overly medicated.

BRIEF DESCRIPTION OF THE DRAWINGS

FIG. 1 is a part schematic representation of a proportioning system made according to the present invention;
FIG. 2 is a side elevational view of a mechanism made according to the present invention; and
FIG. 3 is a sectional view taken as on line 3—3 of FIG. 1.

DESCRIPTION OF THE PREFERRED EMBODIMENT

Referring to FIG. 1, the proportioning device illustrated generally at 10 is used for adding a medicinal ingredient to the water supply for poultry. The poultry fountains are not shown, for convenience of illustration, but can be of any desired construction. Water from a source 11 passes through a pipe 12 and through a conventional water meter 13, a pressure regulator 14 and into a blender tank 15. When the poultry at the fountains drink water, the water will pass from tank 15 through a distributor system of pipe 16. In order to protect the poultry drinking the water against diseases, a certain amount of medicine (or vitamins or other liquid) is added to the water. The meter 13 is of the standard type that has a rotating vane internally. The vane rotates to drive a recording shaft shown schematically at 17 when water passes through the meter. The water meter 13 can be of any preferred construction available on the market and is well known in the art. The shaft 17 is usually used for driving a recording dial finger, but in this instance the shaft 17 has been made as an extension of this recording dial shaft which rotates in proportion to the amount of water flowing through the meter. The shaft 17 is used for controlling the dispensing of the agent to be added to the water.

A medicine supply reservoir 20 is provided and has an outlet pipe 21 leading to the input of a positive displacement pump 22 which can be of any desired type. It has been found that a roller type pump has worked satisfactorily. The pump must be a positive displacement pump so that for each rotation of the pump a predetermined amount of the medicine stored in container 20 will be dispensed through an outlet pipe 23 on the pump.

The pump is driven through a suitable shaft 24 from an electric motor 25 that is powered from a source 26 through a switch 27. The motor 25 in actual practice has a gear reducer head 28 on its output shaft. The gear reducer head has a double ended output shaft shown in FIGS. 1 and 2. The output shaft includes the shaft 24 coupled through coupling 31 to the pump shaft 32 (see FIG. 2) and the other end of the output shaft from the gear head 20 is drivably connected to a flexible shaft 33. The flexible shaft 33 is used for driving a worm 34 which is rotatably mounted on a support bracket 35 and drivably engages a master gear 36. The gear 36 is rotatably mounted onto a support frame 37 (which also supports bracket 35), and rotation of the gear 36 controlled by rotation of the worm 34.

Shaft 17 passes through a provided opening in the support 37 and through a provided bearing block 38 which is also attached to the support 37. The shaft also rotatably passes through gear 36. The gear 36 has a part annular cam member 41 attached thereto and spaced outwardly from the axis of the rotation of the gear. The shaft 17 is co-axial with the gear 36 and the gear is rotatably mounted with respect to the shaft so that the gear 36 and shaft 17 can move independently. The shaft 17 drivably carries a frame 42 which rotates with the shaft. The frame 42 includes a pair of support ears 43 that extend upwardly and are used to pivotally mount a switch dog 44 about an axis 44A. The switch dog 44 has an outwardly extending end portion 44B that is engaged by a spring 45 acting between the frame 42 and the end portion of the switch dog to urge the switch dog about its axis 44A so that a cam follower portion 46 of the switch dog will ride against the top surface of gear 36 or the cam 41 when the cam is placed under the switch dog.

The switch 27 has an actuator finger 47 which rides against the top surface of the switch dog 44. The finger 47 engages the switch dog on a point that is aligned with the axis of shaft 17, so that as the switch dog rotates, the finger 47 will remain in contact with the switch dog.

A pivotal axis 44A of the ears 43 to the switch dog 44 is offset from the axis of rotation of shaft 17 and gear 36. As shown in FIG. 1, when the unit is positioned so that the cam follower portion 46 of switch dog 44 is riding on top of the cam 41, the finger 47 is held in position so that the switch 27 is open and the motor 25 is not powered.

When poultry drink water from the fountains, water will flow through the distributor system out of the blender tank 15. Water goes from the source 11 and through the meter 13 and pressure regulator 14. The shaft 17 of the meter will rotate as water passes through the meter an amount dependent upon the amount of water that is withdrawn. When the shaft 17 rotates, it rotates the frame 42 (gear 36 remains in its position) and also then, the switch dog 44 and its spring 45. The shaft 17 rotates until the switch dog moves down along ramp portion 48 of the cam (depending on the direction of rotation). As the cam follower portion 46 of switch dog 44 drops downwardly toward the gear 36, it can be seen that the contact point between the finger 47 and the switch dog will start to raise (relative to the gear) because of the positioning of the axis 44A between ears 43 and the switch dog 44 in relation to the contact point of finger 47 and the switch dog.

When the cam follower 46 has moved far enough, the finger 47 will close switch 27 to the motor 25 and the motor 25 will be started. Upon rotation of the motor 25 and its gear reducer head output shaft, the pump will be rotated to dispense medicine from source 20 to the blender tank 15. The flexible shaft 33 will also be rotated rotating the worm 34 and, thus, rotating the master gear 36. The direction of rotation is selected so that the gear 36 will follow frame 42, or in other words will rotate in the same direction as the shaft 17, but will do so independently of the shaft. When the shaft 17 stops (only a small amount of water is usually taken at a time) the gear 36 rotates so cam 41 will then engage the cam follower portion 46 and rotation of the gear 36 will cause the cam to lift the cam follower portion of the dog 44 and restore the dog 44 to its initial position to open the switch 27. This will stop the motor 25 and of course, then, the pump 22 will also be stopped and no more medicine will be dispensed into the blender tank. The follow up mechanism thus makes it very easy to control the number of revolutions (or even the fraction of a revolution) of the motor 25 and pump 22 so that the amount of medicine being dispensed can be accurately controlled in relation to the amount of rotation of the shaft 17 of the water meter. By proper gear ratio selection (gears 34 and 36) in relation to the pump size and meter shaft rotation, the proportion of the medicine dispensed to the water passing through will be maintained. When motor 25 runs, the gear 36 rotates faster than the shaft 17 rotates at normal flows. Thus, even if the shaft 17 runs steadily, the medicine will be injected intermittently (the follow up will shut off the motor). This ratio of movement can be easily selected.

The blender tank is used to great advantage in the present system, because by having a blending tank, the medicine can disperse throughout the water in the tank before it is pulled through the pipe 16 to the poultry fountains. In conventional systems great difficulty is encountered by having uneven amounts of medicine in different parts of the water system because the medicine is not permitted to blend adequately with the water. Use of a blender tank in the system to which the medicine is injected makes sure that the medicine adequately disperses through the water.

The blending tank is substantially larger than the amount of medicine dispensed each time the pump turns on to insure adequate dispersion of the medicine. The system does normally operate intermittently. In other words, flow is intermittent so the action is for the meter to move and then stop. The cam thus overruns the stopped switch dog and only a very small amount of medicine is dispensed each time. The intermittent action is considered normal flow, as well as a small continuous flow.

While the description has dealt with poultry water supplies and medicine addition in particular, the proportioning device can also work for many other things such as adding liquid fertilizer to an irrigation or watering system (a plastic blender tank is very helpful for the caustic solution). It also can add sanitizing agents to various types of wash water; chlorine to drinking water or for swimming pools, and also it can be used for adding agents to control algae and the like in water storage tanks. Any liquid or liquid soluble chemical can be added to another liquid in the desired proportion.

What is claimed is:

1. A liquid proportioning device for adding material to a liquid being dispensed, comprising in combination a source of a first liquid, meter means to measure the amount of said first liquid being dispensed, said meter means including an element that rotates in direct relationship to the amount of liquid being dispensed, a source of a second liquid, means to dispense a predetermined amount of said second liquid into said first liquid after said first liquid has passed through said meter means, said means for dispensing said second liquid including a motor, a positive displacement dispensing means driven by said motor for transferring said second liquid from its source to said first liquid, a switch for controlling said motor, control means including a rotating actuator attached to the rotatable element of said meter means, a gear set including a master gear coaxial with said rotating actuator, cam means on said master gear to control said actuator from a first position to a second position, said actuator moving to its second position wherein said switch is closed to energize said motor after said meter means has rotated a first predetermined amount, said gear set being driven by said motor means to position to move said actuator to its first position and to open said switch after said motor has rotated a second predetermined amount in relation to the amount of rotation of said rotatable element.

2. The combination as specifid in claim 1 wherein said master gear rotates at a rate faster than said meter means rotatable element at normal flows of the first liquid through the meter means.

3. The combination as specified in claim 1 and a blender tank in the system, said first source of liquid discharging liquid into said blender tank after passing through said meter, and said second source discharging liquid into said blender tank.

4. The combination as specified in claim 3 wherein said blender tank is of a size that is substantially larger than the amount of said second liquid being dispensed.

5. The combination as specified in claim 1, and frame means for supporting said motor, said positive displacement dispensing means, and said switch with respect to said meter means, said rotatable element on said meter means comprising an output shaft rotatable in response to movement of said first liquid through said meter means, said output shaft rotatably passing through a portion of said frame and rotatably passing through a portion of said frame and rotatably passing through said master gear of said gear set, means between said motor and said master gear to rotate said master gear independently of movement of said meter shaft, said actuator member being drivably mounted on said meter shaft about an axis substantially coincidental with said gear, said actuator member including a pivoted switch dog thereon, said pivot of said switch dog being offset from the axis of rotation of said shaft and master gear, said switch dog having a cam means follower portion, means urging said switch dog into engagement with said cam means on said gear, and a switch finger controlling said switch and riding on said switch dog about a point substantialy coincidental with the axis of rotation of said actuator, said switch finger being positioned with respect to the pivot of the switch dog so said dog moves the switch to an open position whenever the cam follower portion of said switch dog is on said cam, said switch dog rotating with said shaft to a position where it releases from said cam and moves said switch finger to position closing said switch, said motor means driving said master gear so that said cam overtakes said switch dog upon energization of said motor.

6. The combination as specified in claim 5 wherein said means between said motor and said master gear includes a worm rotatably mounted on said frame and driving said master gear.

7. The combination as specified in claim 5 wherein the positive displacement dispensing means comprises a rotatable pump driven by said motor.

References Cited

FOREIGN PATENTS 21,952    8/1929    Australia.

SAMUEL F. COLEMAN, Primary Examiner